Oct. 31, 1933.  G. A. MILLARD  1,932,798
MOTOR VEHICLE
Filed Dec. 2, 1932  2 Sheets-Sheet 1
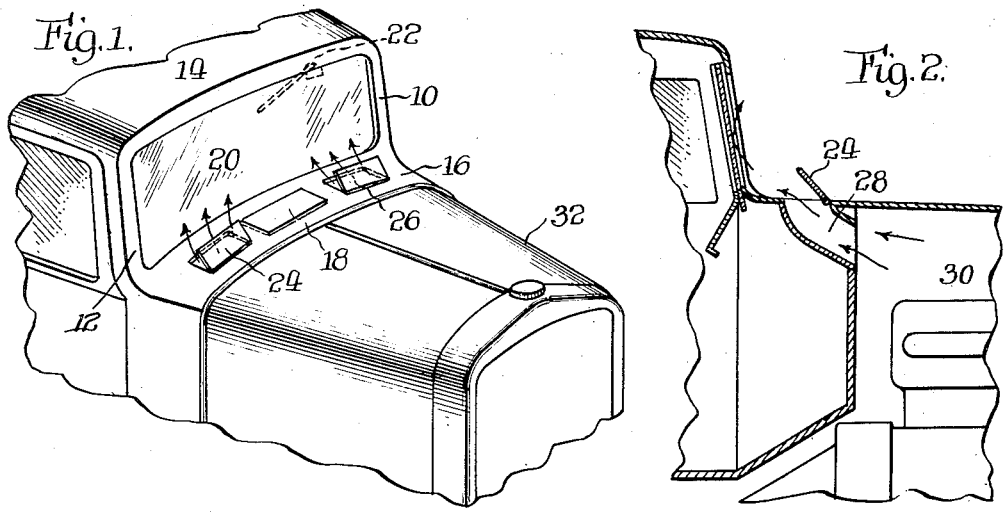
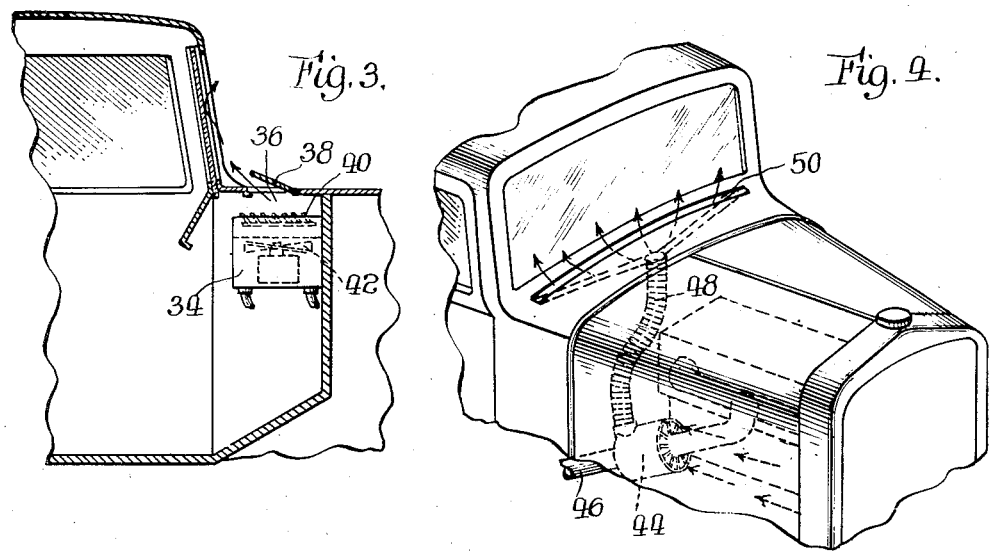
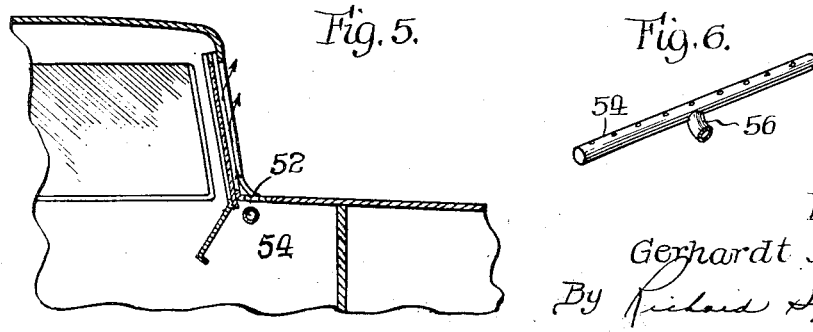
Inventor:
Gerhardt A. Millard,
By Richard Spencer
Atty.

Oct. 31, 1933.  G. A. MILLARD  1,932,798
MOTOR VEHICLE
Filed Dec. 2, 1932   2 Sheets-Sheet 2

Inventor:
Gerhardt A. Millard,
By Richard Spencer.
Atty.

Patented Oct. 31, 1933

1,932,798

UNITED STATES PATENT OFFICE 1,932,798

MOTOR VEHICLE

Gerhardt A. Millard, Chicago, Ill.

Application December 2, 1932. Serial No. 645,329

3 Claims. (Cl. 20—40.5)

This invention relates to automobiles and the like, and has for one of its primary objects the incorporation in a vehicle of novel means for preventing the accumulation of ice and snow on the glass window portions thereof. In the case of a motor car the invention will primarily be employed to prevent the deposit of ice and snow on the windshield, but it is to be recognized that, in certain aspects, the invention has a broader application and may be applied to other transparent surfaces through which clear vision is an essential consideration.

Every motorist of today appreciates the difficulty, even the danger, of driving in a snow, sleet, or hail storm, or in rain when the temperature is below freezing. The windshield becomes congested making it impossible for the driver to obtain an unobstructed view of the road ahead. Frequently, the deposit is so heavy or solid that windshield wipers are rendered inoperative and the motorist is practically helpless. The result of this so-called "blind" driving is that collisions and other accidents occur with the resultant frequent injury to property and occasional bodily injury or loss of life.

Others before this have realized the difficulties and dangers above described and have proposed various remedies. For example, there has been placed upon the market a chemical compound which, when rubbed upon the windshield, is supposed to set up a chemical reaction that prevents the accumulation of ice and snow. This medium is, however, open to numerous objections. In the first place, its application is distasteful owing to its greasy character and the fact that it must be thoroughly rubbed onto all parts of the shield and the excess thereafter rubber off. Then also, its very application frequently causes visual distortion of images viewed through it and thereby prevents clear vision as much as it brings it about. Furthermore, even the best of these do not last very long with the result that repeated applications are necessary, each of which requires that the driver get out of the car and expose himself as he makes the necessary application. Lastly and most important of all, few, if any, of these pastes perform their intended functions.

Mechanical and electrical devices and appliances of various kinds have been put on the market but they also are subject to various objections. In the first place they are expensive; in the second, they are likely to get out of order, in the last place, they, too are not satisfactory in operation. They are also subject to other objections that it is unnecessary to discuss.

Furthermore, various patents have been granted covering arrangements for directing a flow of warm air across the exposed face of the windshield to prevent the accumulation of ice and snow. It has been found, however, that the use of warm air alone is often insufficient for the purpose of accomplishing the intended result. Accordingly an important object of the present invention resides in the combination with a stream of warm air flowing upon a windshield, of means for supplying an anti-freeze compound to the flowing stream of air. Glycerin is a well-known anti-freeze chemical and by inserting a container in the air passageway and allowing the glycerin to be dispersed into the air stream through the simple expedient of a wick or other suitable means, the combined effect of the air and the anti-freeze compound is obtained.

There are various other ways of practicing the invention. For example, if temperatures are extremely low it may be desirable to employ a muffler stove to heat the air to a suitable temperature before releasing it upon the windshield. Likewise, electric heaters might be employed for the purpose of warming the air prior to directing it against the windshield. Similarly, vents of various types and shapes may be employed without departing from the true scope of the invention as outlined in the following description, and the appended claims.

Additional objects and features of the invention will appear from a reading of the specification in the light of the accompanying drawings, in which Fig. 1 is a fragmentary view, in perspective, of a motor car body provided with means for releasing a current of air across the face of the windshield.

Fig. 2 is a view in section of that portion of the body shown in Fig. 1.

Fig. 3 is a view similar to Fig. 2 showing a modified form.

Fig. 4 is a view similar to Fig. 1 showing a further modification thereof.

Figs. 5 and 6 serve to illustrate still an additional manner of carrying out the arrangement.

Figure 7:
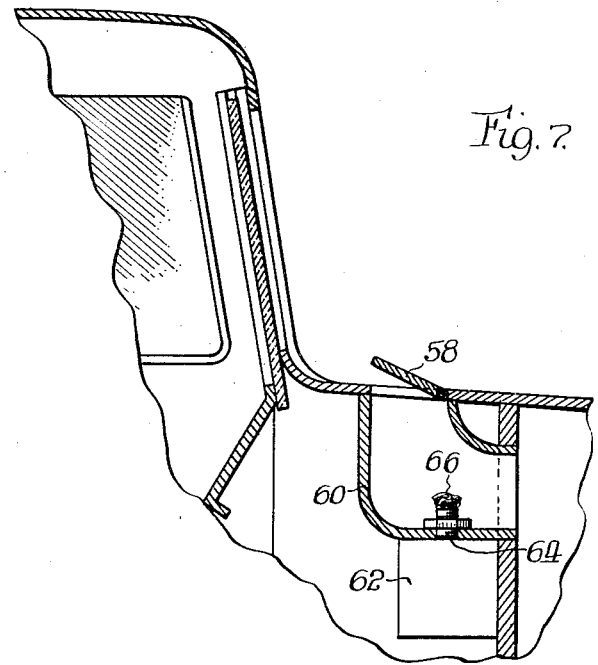
Figure 8:
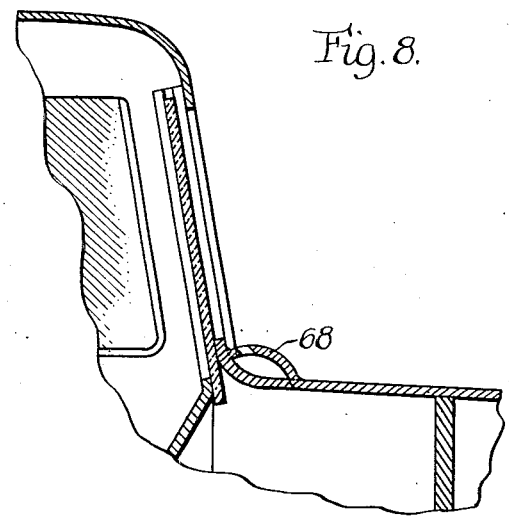

Fig. 7 is a view in section of the cowl portion of a motor car equipped to supply both warm air and an anti-freeze compound to the windshield, and Fig. 8 is a view of another modification of the arrangement as shown in Figs. 1 to 6 inclusive.

In Fig. 1 there is shown a motor car body of standard design provided with corner posts 10, 12, a roof 14, and a cowl 16. Located centrally of the cowl there is shown the well-known ventilator 18 which may be raised or lowered to permit outside air to flow into the inside of the car.

Above the cowl is located an ordinary windshield 20 provided, as illustrated, with the customary wiper 22, the purpose of which is to keep that portion of the shield located in front of the driver, clear of any water that may be deposited there. As already stated, the wiper is not strong or heavy enough to remove snow and ice that accumulates, and therefore it is not intended to perform the function of the present invention. However, as will become apparent during a reading of this description, it may lend its cooperation to the achievement of the desired end.

In order to prevent the accumulation of ice and snow, the invention proposes to pass a current of warm air over the surface of the windshield and to this end the cowl 16 on the opposite sides of the ventilator 18 is provided with a plurality of auxiliary vents 24, 26, which, as shown in Fig. 2, are, by means of ducts 28, in communication with the space 30 below the engine hood 32. In driving, the engine generates heat which is imparted to the air beneath the hood causing a supply of warm air to be stored at that point. This affords a convenient and readily accessible supply which, if properly directed against the face of the windshield, will achieve the desired result. Accordingly, the ducts 28 serve as passageways through which the warm air flows, and the covers 24, 26, of the vents, when opened, as shown in Fig. 2, act as baffles to direct the air in the proper direction. Owing to movement of the car, the rising column of heated air is brought into intimate engagement with the shield, causing dispersion to take place with the result that the small heated particles of air are rubbed over the exposed surface of the windshield, which action is sufficient to overcome the tendency of the snow and ice to accumulate.

It will be at once appreciated by any one skilled in the art that there are various ways of practicing this part of the invention. For example, the warm air may be derived from some other source, (although one of the most logical supplies is from beneath the hood); likewise, the vents may be of different shape and arrangement or location from those shown in Fig. 1; similarly, mechanical means may be engaged for propelling the warm air in the direction of the windshield. Thus, as shown in Fig. 3, an electric heater 34 is arranged beneath a vent 36 having a closure, or cover, 38, and comprises a heating element 40 and a fan 42. In operation, the fan blows the air across the heating element 40 causing the temperature of the air to be raised and then it is directed into the vent 36 and thence into engagement with the windshield.

In Fig. 4, the invention is shown as comprising a stove 44 arranged to surround the ordinary exhaust outlet 46, and a flexible tube 48 leading between the stove and an elongated vent 50, which extends slotwise across the base of the windshield. It may be found that under certain conditions, such as abnormal temperatures and the like, the stove will be necessary in order to impart the desired temperature to the air.

Coming now to Fig. 5, there is shown therein a vent 52 placed at the bottom of the shield having beneath it a warm air pipe 54 of the form shown in Figure 6. The pipe is provided with a section 56 adapted to be connected with a suitable source of warm air supply.

In Fig. 7 there is shown an important feature and embodiment of this part of the invention. It has long been known that certain chemicals such, for example, as glycerin, have anti-freeze characteristics and that if applied to a surface will, for a little while, prevent freezing from taking place. It is this principle that is utilized in the soap pastes that have been, and are being, employed to prevent the accumulation of snow and ice on windshields. However, as already stated, these pastes are subject to numerous objections. In the first place, they must be rubbed on by hand; they wear off in a little while; they must be rubbed on very carefully to insure the application of an even layer, etc. By means of the present invention, anti-freeze compounds may be employed expediently and conveniently to perform the same function heretofore performed by the pastes. Accordingly, as shown in Fig. 7, the cowl of the motor car is provided with air ducts or passageways 60 having covers 58 and within each duct there is located a container or casing 62 for holding a supply of anti-freeze compound such as glycerin. The container has a neck portion 64 that extends into the passageway and a capillary wick 66 that extends within the air stream. Warm air flowing through the passageway 60 is impinged upon the exposed wick, and, by means of capillary attraction, picks up the anti-freeze compound and carries it with the air stream into intimate contact, or engagement, with the windshield. Applying the anti-freeze compound in this manner eliminates several of the previous objections. For one thing, its application is automatic, and for another, it is continuous. These two features are noteworthy in their importance. Compare, for example, the practicality of the construction shown in Fig. 7 with the present day practice which consists in carrying a tin of paste somewhere about the car and repeatedly smearing it over the outside of the windshield. It must be appreciated that the employment of the anti-freeze compound permits a lowering of the temperature of the air stream. However, owing to the constant availability of a warm air supply, it will generally be preferable to use the anti-freeze mixture with heated air.

In Fig. 8 there is disclosed a manner of carrying out the invention which dispenses with the necessity of providing vents in the cowl of the car. As there illustrated, a fillet, or small housing, 68, extends transversely of the car body, at the base of the windshield, and is provided with openings in its top surface from which warm air is permitted to escape. It will be understood that the anti-freeze supplying device may be conveniently located within the housing 68 or in the passageway between the housing and the air supply.

All of the described species, and many others, may be employed in order to accomplish the purposes and intents of the invention. Likewise, various changes, additions, and modifications may be made in the illustrated embodiments without departing from the invention. For instance, the vent covers may be provided with handles to permit their operation from within the car; the vents in Figs. 4 and 5 may be provided with covers; the location and shape of the vents may be changed in any desired manner, as, for example, by placing the vents within the windshield frame itself; and the warm air may be obtained from sources other than those illustrated.

It will be observed that in the foregoing description, reference has repeatedly been made to "motor vehicles". By this term is meant such vehicles as automobiles, street-cars, airplanes, boats and the like. Furthermore, the invention in some phases may have application to other transparent surfaces not carried by motor vehicles.

Having thus described my invention what I claim as new, and desire to secure by Letters Patent of the United States is:

1. A motor vehicle body having, in combination, a windshield, a source of warm air, a passageway communicating said source of warm air with the exterior surface of the windshield and means associated with the passageway for supplying an anti-freeze compound to the warm air moving through said passageway.

2. A motor vehicle body having, in combination, a windshield, a source of warm air, a passageway communicating said source of warm air with the exterior surface of the windshield, a cover for said passageway, and a container inserted at a point along said passageway, said container being adapted to hold an anti-free compound for injection into the warm air flowing through said passageway.

3. A motor vehicle body comprising, in combination, a windshield, a duct located at the base of the windshield, a passageway communicating with said duct, means for introducing a moving column of air into said passageway, and means for injecting an anti-freeze compound into said moving column of air.

GERHARDT A. MILLARD.